(12) United States Patent
Chakraborty et al.

(10) Patent No.: US 12,475,172 B2
(45) Date of Patent: Nov. 18, 2025

(54) ZONE-BASED DATABASE MANAGEMENT SYSTEMS AND METHODS FOR DATA GOVERNANCE

(71) Applicant: Truist Bank, Charlotte, NC (US)

(72) Inventors: Sunilam Chakraborty, Knightdale, NC (US); Jatin Hansoty, Cary, NC (US); Pranjal Goswami, Knightdale, NC (US); Anirban Sharma, Chapel Hill, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/524,502

(22) Filed: Nov. 30, 2023

(65) Prior Publication Data

US 2025/0181648 A1    Jun. 5, 2025

(51) Int. Cl.
*G06F 16/904*        (2019.01)

(52) U.S. Cl.
CPC .................... *G06F 16/904* (2019.01)

(58) Field of Classification Search
CPC ...... G06F 16/00; G06F 16/125; G06F 16/248; G06F 16/26; G06F 16/285; G06F 16/335; G06F 16/9038; G06F 16/904; G06F 16/906; G06F 3/04842; G06F 2221/2141; G06F 21/6254; G06N 20/00; G06N 7/01; G06N 3/08
See application file for complete search history.

(56) References Cited

U.S. PATENT DOCUMENTS

| | | | |
|---|---|---|---|
| 8,713,076 B2 | 4/2014 | Martin | |
| 8,719,315 B2 | 5/2014 | Schuler | |
| 9,870,411 B2 | 1/2018 | Liu | |
| 2012/0317155 A1 | 12/2012 | Ogasawara | |
| 2017/0242817 A1* | 8/2017 | Sane | G06F 13/16 |
| 2018/0210936 A1* | 7/2018 | Reynolds | G06F 21/6227 |
| 2018/0225368 A1 | 8/2018 | Grond | |
| 2020/0019558 A1* | 1/2020 | Okorafor | G06F 21/6254 |
| 2020/0311031 A1* | 10/2020 | Sim-Tang | G06F 21/6245 |
| 2021/0349884 A1* | 11/2021 | Aaron | G06F 40/40 |
| 2022/0215111 A1* | 7/2022 | Ekins | G06F 21/6218 |
| 2025/0181567 A1* | 6/2025 | Chakraborty | G06F 16/26 |

* cited by examiner

Primary Examiner — Robert W Beausoliel, Jr.
Assistant Examiner — Cheryl M Shechtman
(74) Attorney, Agent, or Firm — Michael A. Springs, Esq.; Shumaker, Loop & Kendrick, LLP; Patrick B. Horne

(57) ABSTRACT

Systems and methods are disclosed for moving data based on data governance policies, wherein a plurality of datasets from a plurality of sources are received and stored into a data catalog. Predefined zones are generated, each having predefined policies. At least one common characteristic is determined for a first dataset and a second dataset. The system receives a request from an authorized user to move the first and second datasets into a particular zone and moves the datasets accordingly. The system then displays, via a graphical user interface, a representation depicting the first and second datasets. The predefined zones include a transient zone, a raw zone, a trusted zone, and a refined zone. The plurality of datasets move through the zones through a data pipeline that performs a data quality check to ensure that the data is moved through the zones according to the predefined polices.

19 Claims, 14 Drawing Sheets

ZONE-BASED DATABASE MANAGEMENT SYSTEMS AND METHODS FOR DATA GOVERNANCE

FIELD OF THE INVENTION

This invention relates generally to the field of data governance architecture, and more particularly embodiments of the invention relate to systems and methods for managing data and assets in various zones in a database.

BACKGROUND OF THE INVENTION

Data governance involves establishing policies and procedures to ensure high data quality and compliance with various regulations. Governance of the data allows the data to be available, usable, and secure according to an organization's policies. Many organizations, including financial institutions are built on data, so data governance is of critical concern. While many companies have their own definition of what qualifies as data governance, it typically entails establishing governance bodies and councils, defining data stewardship and workflow, and various data management and quality programs. In general, data governance includes the systemic and formal management of any process or service that is require for effective data/information management. Additionally, many data governance policies are actually mandated by various regulations around the world.

While data governance policies may be written down, a need exists for a quicker and more efficient process for governing data while ensuring the availability and accuracy of the data and reducing risk or improper usage of the data.

Machine learning techniques help integrate customer data silos even in the absence of unique Identifiers from various operational systems. Such systems can use probabilistic matching for record linkage, data clustering and classification techniques along with reinforcement learning for automation on scale out platforms to add significant value to how data can be leveraged as an asset. Delivering MDM functionality can be done on a big data scale by various unified data governance platforms. These platforms provide a Spark-based scale out implementation for matching, linking and mastering, with support for pluggable machine learning libraries that will enable end users to master customer, product and additional data domains using a set of consistent processes and methodologies. The model is flexible based on an organization's business requirements and does not require a specific type of data model for the data entities to be mastered. Spark-based machine learning has several advantages over traditional data matching. It matches all types of data domains, it has "live" training that provide unlimited flexibility, and it scales to volumes that weren't previously attainable. The end result is an agile master data management capability.

A key component of MDM is the classification of datasets to enable users to locate stored data relevant to a work task. Various known algorithms have been used in the classification process. Some of the commonly used types of classification algorithms are described below with advantages and disadvantages.

Logistic Regression is a machine learning algorithm for classification. In this algorithm, the probabilities describing the possible outcomes of a single trial are modelled using a logistic function. An advantage of logistic regression is that it designed for classification purposes and is most useful for understanding the influence of several independent variables on a single outcome variable. Disadvantages are that it works only when the predicted variable is binary, assumes all predictors are independent of each other and assumes data is free of missing values.

The Naive Bayes algorithm is based on Bayes' theorem with the assumption of independence between every pair of features. Naive Bayes classifiers work well in many real-world situations such as document classification and spam filtering. Advantages of this algorithm are that it requires a small amount of training data to estimate the necessary parameters. Naive Bayes classifiers are extremely fast compared to more sophisticated methods. A disadvantage is that Naive Bayes is known to be a bad estimator.

Stochastic Gradient Descent is a simple and very efficient approach to fit linear models. It is particularly useful when the number of samples is very large. It supports different loss functions and penalties for classification. Advantages are efficiency and ease of implementation. Disadvantages are that it requires a number of hyper-parameters and it is sensitive to feature scaling.

K-Nearest Neighbors classification is a type of lazy learning as it does not attempt to construct a general internal model, but simply stores instances of the training data. Classification is computed from a simple majority vote of the K nearest neighbors of each point. Advantages are that this algorithm is simple to implement, robust to noisy training data, and effective if training data is large. Disadvantages are the need to determine the value of K and the computation cost is high as it needs to compute the distance of each instance to all the training samples.

Decision Tree—Given a data of attributes together with its classes, a decision tree produces a sequence of rules that can be used to classify the data. Advantages are that it is simple to understand and visualize, requires little data preparation, and can handle both numerical and categorical data. Disadvantages are that it can create complex trees that do not generalize well, and decision trees can be unstable because small variations in the data might result in a completely different tree being generated.

The Random Forest classifier is a meta-estimator that fits a number of decision trees on various sub-samples of datasets and uses average to improve the predictive accuracy of the model and controls over-fitting. The sub-sample size is always the same as the original input sample size but the samples are drawn with replacement. Advantages are a reduction in over-fitting and is more accurate than decision trees in most cases. Disadvantages are slow real time prediction, difficult to implement, and a complex algorithm.

The Support Vector Machine is a representation of the training data as points in space separated into categories by a clear gap that is as wide as possible. New examples are then mapped into that same space and predicted to belong to a category based on which side of the gap they fall. Advantages are effective in high dimensional spaces and uses a subset of training points in the decision function so it is also memory efficient. Disadvantages are that the algorithm does not directly provide probability estimates, these are calculated using an expensive five-fold cross-validation.

Owners and managers of data assets in an organization are required to properly control how data is handled and ensure that certain data governance policies, practices, and processes are in place to manage their data effectively and ensure its quality, security, and compliance. Key components of proper data governance include data ownership, data quality, data security, data privacy, data cataloging, data lifecycle management, data access and permissions, data governance compliance and auditing, data documentation, data stewardship, data governance framework, and data training and awareness. Thus, proper data governance allows organizations to maximize the value of their data assets, minimize risks such as data misuse, and enhance decision-making processes by using the data to better understand the needs of the organization or its customers. Although data or digital assets have inherent traits such as metadata and data fields, without a proper visual or structural representation of the interconnectedness of the data, a data steward may spend unnecessary time and resources trying to understand the data. Thus, a need exists for improved systems and methods for managing and governing digital assets that are streamlined and automated to addresses these shortcomings.

BRIEF SUMMARY

Shortcomings of the prior art are overcome and additional advantages are provided through the provision of systems and methods for zone-based database management through the use of a zones or containers that can be assigned to artifacts such as datasets to improve efficiency, security, and overall data management.

A computer system for creating and for generating dataset zones, the system including at least one processor, a communication interface communicatively coupled to the at least one processor, and a memory device storing executable code that, when executed, causes the at least one processor to, in part, receive a plurality of datasets from a plurality of sources using a computer, the datasets including a plurality of characteristics and to store the plurality of datasets into a data catalog. The system generates a first zone or transient zone, wherein the transient zone is configured for storing the sourced data from the plurality of datasets, and wherein the sourced data in the transient zone has not be ingested or processed. The system further generates a second zone or raw zone, wherein the raw zone is configured for storing raw data generated from the sourced data after it has been ingested, processed, and organized, and wherein the raw data in the raw zone is still in its original format as received from the plurality of sources. The system generates a third zone or trusted zone, wherein the trusted zone is configured for storing standardized data generated from the raw data after it has been ingested, processed, and organized according to one or more policies. Finally, the system generates a fourth zone or refined zone, wherein the refined zone is configured for storing business-specific data generated from the standardized data after it has been associated with one or more lines of business. Then the system displays, via a graphical user interface, a representation of the first zone, the second zone, the third zone, and the fourth zone.

In example embodiments, an authorized user is permitted to create new zones.

In particular embodiments, the executable code, when executed, further causes the processor to receive a request from an authorized user to move a first dataset into at least one of the first zone, the second zone, the third zone, and the fourth zone.

In various embodiments, the executable code, when executed, further causes the processor to receive a request from an authorized user to generate a fifth zone or analytical workspace zone, wherein the analytical workspace zone is configured for storing data that can be validated without altering the data in any other zone, and wherein the analytical workspace zone includes an experimental zone for ad-hoc use cases.

In example embodiments, the plurality of datasets move through the first zone, the second zone, the third zone, and the fourth zone through a data pipeline. In particular, the data pipeline performs a data quality check to ensure that the plurality of datasets are moved through the first zone, the second zone, the third zone, and the fourth zone according to one or more predefined policies. In example embodiments, the one or more policies may be corporate governance policies, quality control policies, and/or role-based access control policies.

In particular embodiments, the representation displayed via the graphical user interface is a governance graph. The representation may include artifacts, wherein the artifacts are at least one of a report, governance graph, data lineage, and/or glossary.

According to example embodiments, a computer-implemented method for generating dataset zones includes the steps of: (1) receiving a plurality of datasets from a plurality of sources using a computer, the datasets including a plurality of characteristics; (2) storing the plurality of datasets into a data catalog; (3) generating a first zone comprising a transient zone, wherein the transient zone is configured for storing the sourced data from the plurality of datasets, and wherein the sourced data in the transient zone has not been ingested or processed; (4) generating a second zone comprising a raw zone, wherein the raw zone is configured for storing raw data generated from the sourced data after it has been ingested and organized; and wherein the raw data in the raw zone is still in its original format; (5) generating a third zone comprising a trusted zone, wherein the trusted zone is configured for storing standardized data generated from the raw data after it has been ingested and organized according to one or more policies; (6) generating a fourth zone comprising a refined zone, wherein the refined zone is configured for storing business-specific data generated from the standardized data after it has been associated with one or more lines of business; and (7) displaying, via a graphical user interface, a representation comprising the first zone, the second zone, the third zone, and the fourth zone.

In particular embodiments, each of the one or more lines of business has its own predefined policies.

In various embodiments, the method further includes generating a fifth zone or analytical workspace zone, wherein data in the analytical workspace zone can be validated without altering the data in any of the other zones, and wherein the analytical workspace zone includes an experimental zone for ad-hoc use cases.

In example embodiments, generating the standardized data includes cleansing and validating the raw data. The cleansing and validating of the raw data includes at least one of data quality checks, masking, tokenization, removing personal information, removing personally identifiable information, removing sensitive information, and removing protected personal information.

According to example embodiments, a computer-implemented method for moving datasets between zones includes the steps of: (1) receiving a plurality of datasets from a plurality of sources using a computer, the datasets including a plurality of characteristics; (2) storing the plurality of datasets into a data catalog; (3) generating one or more predefined zones, wherein each of the one or more predefined zones includes one or more policies; (4) determining at least one common characteristic for a first dataset and a second dataset from the plurality of datasets; (5) receiving a request from an authorized user to move the first dataset and the second dataset into a particular zone of the one or more predefined zones; (6) moving the first dataset and the second dataset into the particular predefined zone; and (7) displaying, via a graphical user interface, a representation comprising the first dataset and the second dataset in the particular predefined zone.

In example embodiments, the authorized user is a data steward. In some embodiments, the authorized user can override the one or more policies of the one or more predefined zones.

In various embodiments, the one or more policies include data movement policies, wherein the data movement policies require particular steps to be executed before data can be moved from a first zone to a second, third, fourth, or fifth zone. In particular, the data movement policies include processes preventing data from being moved without following particular rules.

According to example embodiments, the system including at least one processor, a communication interface communicatively coupled to the at least one processor, and a memory device storing executable code that, when executed, causes the at least one processor to, in part, receive a plurality of datasets from a plurality of sources using a computer, the datasets including a plurality of characteristics. The system stores the plurality of datasets in a data catalog. The system generates one or more predefined zones, wherein each of the one or more predefined zones includes one or more policies. The system determines at least one common characteristic for a first dataset and a second dataset from the plurality of datasets. The system then receives a request from an authorized user to move the first dataset and the second dataset into a particular zone of the one or more predefined zones and moves the first dataset and the second dataset into the particular predefined zone. In response, the system displays, via a graphical user interface, a representation of the first dataset and the second dataset in the particular predefined zone.

According to example embodiments, a computer-implemented method for zone-based database management includes the steps of: (1) receiving a plurality of datasets from a plurality of database sources using a computer, the datasets including a plurality of characteristics; (2) storing the plurality of datasets into a data catalog; (3) generating one or more predefined zones, wherein each of the one or more predefined zones includes one or more policies; (4) storing the plurality of datasets into at least one of the one or more predefined zones; (5) training, via an iterative training and testing loop, a machine learning program utilizing at least one neural network to generate a trained predictive model, a training dataset utilized during the training of the machine learning program comprising the one or more policies of the one or more predefined zones, the training comprising: (a) inserting a target variable value into the iterative training and testing loop; and (b) iteratively predicting the target variable via the iterative training and testing loop, wherein iterative predictions of the target variable comprise modifying weights and calculations applied to the training dataset during subsequent prediction iterations in order to improve predictability of the target variable; (6) deploying the trained predictive model; (7) predicting, by the predictive model, at least one common policy for a first dataset and a second dataset from the plurality of datasets; (8) predicting, by the predictive model, a dataset zone based on the at least one common policy; (9) generating a predicted dataset zone not included in the one or more predefined zones; and (10) displaying, via a graphical user interface, a representation comprising the first dataset and the second dataset in the predicted dataset zone.

In example embodiments, an authorized user is permitted to alter, delete, or change one or more policies associated with the predicted dataset zone.

According to example embodiments, a computer-implemented method for generating zone-based database management includes the steps of: (1) receiving a plurality of datasets from a plurality of sources using a computer, the datasets including a plurality of characteristics; (2) storing the plurality of datasets into a data catalog; (3) generating a first zone comprising a transient zone, wherein the transient zone is configured for storing the sourced data from the plurality of datasets, and wherein the sourced data in the transient zone has not been ingested or processed; (4) generating a second zone comprising a raw zone, wherein the raw zone is configured for storing raw data generated from the sourced data after it has been ingested and organized; and wherein the raw data in the raw zone is still in its original format; (5) generating a third zone comprising a trusted zone, wherein the trusted zone is configured for storing standardized data generated from the raw data after it has been ingested and organized according to the one or more policies; (6) generating a fourth zone comprising a refined zone, wherein the refined zone is configured for storing business-specific data generated from the standardized data after it has been organized by one or more lines of business; (7) training, via an iterative training and testing loop, a machine learning program utilizing at least one neural network to generate a trained predictive model, a training dataset utilized during the training of the machine learning program comprising the one or more policies of the one or more predefined zones, the training comprising: (a) inserting a target variable value into the iterative training and testing loop; and (b) iteratively predicting the target variable via the iterative training and testing loop, wherein iterative predictions of the target variable comprise modifying weights and calculations applied to the training dataset during subsequent prediction iterations in order to improve predictability of the target variable; (8) deploying the trained predictive model; (9) predicting, by the predictive model, a data privacy policy for a first dataset from the plurality of datasets; (10) predicting, by the predictive model, a suitable zone for the first dataset between the first zone, second zone, third zone, and fourth zone based on the predicted data privacy policy; (11) storing the first dataset in the suitable zone; and (12) displaying, via a graphical user interface, a representation comprising the first dataset in the suitable zone.

In example embodiments, the suitable zone includes a secure zone, wherein the secure zone is configured for storing one or more datasets that contain at least one of personal information, personally identifiable information, sensitive information, and protected personal information. In some embodiments, the suitable zone is an unsecure zone, wherein the unsecure zone is configured for storing basic datasets that contain public information.

In particular embodiments, the suitable zone is an uncategorized zone that may be capable of storing data that does meet the requirements or policies of the other zones.

In various embodiments, an authorized user defines dataset characteristics and zone rules for the suitable zone.

According to example embodiments, a system including at least one processor, a communication interface communicatively coupled to the at least one processor, and a memory device storing executable code that, when executed, causes the at least one processor to, in part, receive a plurality of datasets from a plurality of sources using a computer, the datasets including a plurality of characteristics. The system stores the plurality of dataset into a data catalog. The system generates a first zone or transient zone, wherein the transient zone is configured for storing the sourced data from the plurality of datasets, and wherein the sourced data in the transient zone has not be ingested or processed. The system further generates a second zone or raw zone, wherein the raw zone is configured for storing raw data generated from the sourced data after it has been ingested, processed, and organized, and wherein the raw data in the raw zone is still in its original format as received from the plurality of sources. The system generates a third zone or trusted zone, wherein the trusted zone is configured for storing standardized data generated from the raw data after it has been ingested, processed, and organized according to one or more policies. Finally, the system generates a fourth zone or refined zone, wherein the refined zone is configured for storing business-specific data generated from the standardized data after it has been associated with one or more lines of business. The system then trains, via an iterative training and testing loop, a machine learning program utilizing at least one neural network to generate a trained predictive model, a training dataset utilized during the training of the machine learning program including one or more policies of the one or more predefined zones. The training includes: (1) inserting a target variable value into the iterative training and testing loop; and (2) iteratively predicting the target variable via the iterative training and testing loop, wherein iterative predictions of the target variable comprise modifying weights and calculations applied to the training dataset during subsequent prediction iterations in order to improve predictability of the target variable. The system then deploys the trained predictive model to: (1) predict, by the predictive model, a data privacy policy for a first dataset from the plurality of datasets; and (2) predict, by the predictive model, a suitable zone for the first dataset between the first zone, second zone, third zone, and fourth zone based on the predicted data privacy policy. The system then stores the first dataset in the suitable zone and displays, via a graphical user interface, a representation of the first dataset in the suitable zone.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION OF EMBODIMENTS OF THE INVENTION

Figure 1:
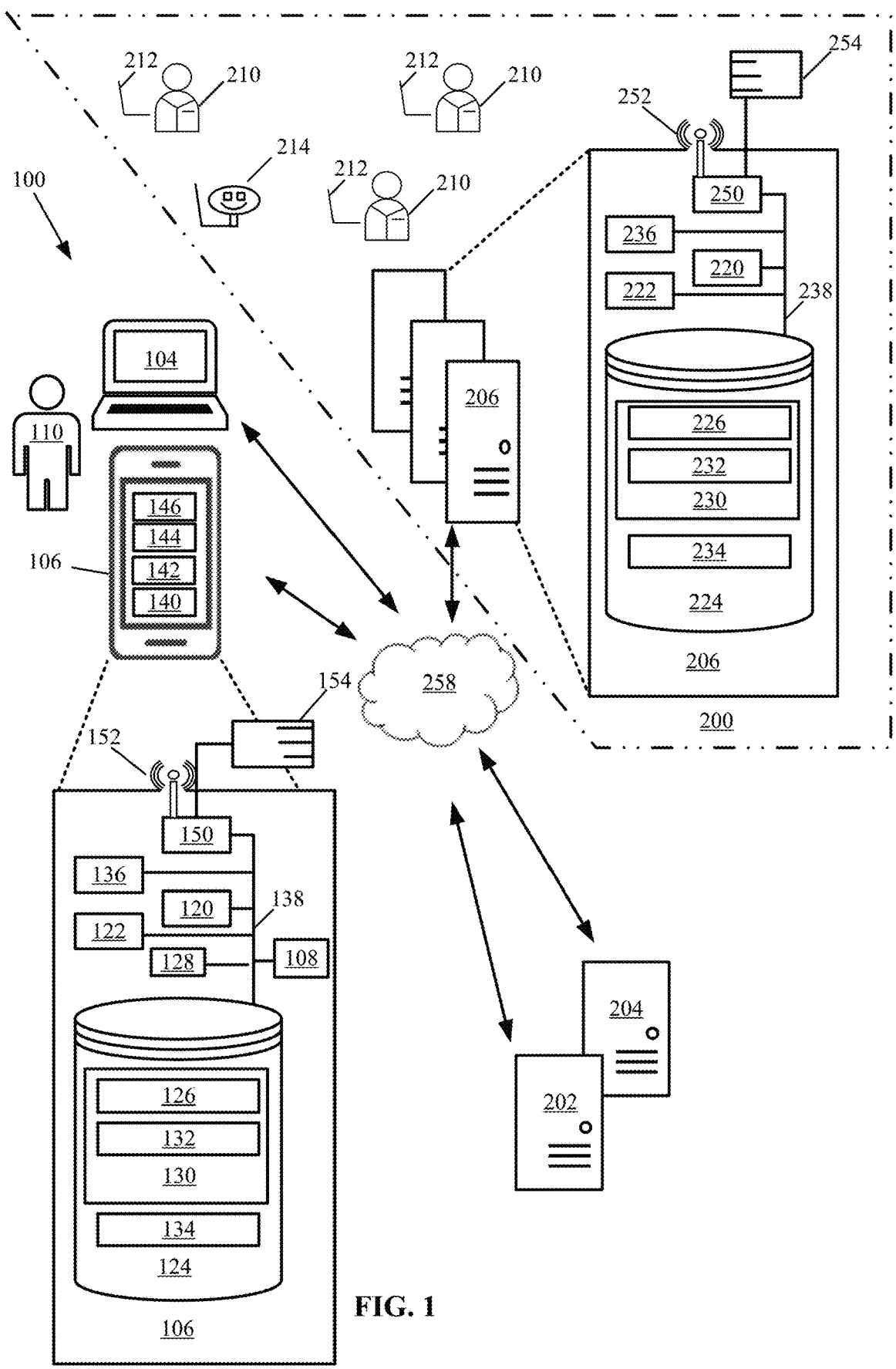
FIG. 1 illustrates an enterprise system and environment thereof for creating a governance graph of data asset connections for digital assets in a data catalog, in accordance with an embodiment of the present invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, Internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the Internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
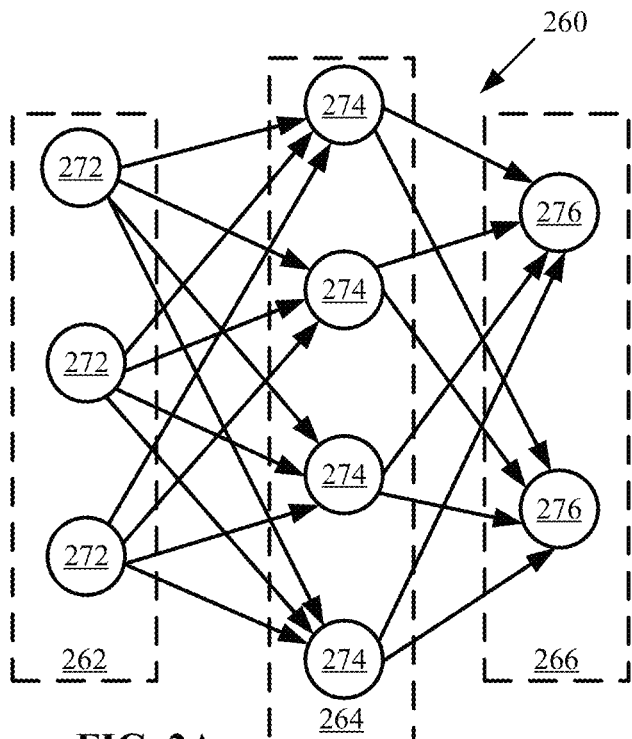
FIG. 2A is a diagram of a feedforward network, according to at least one embodiment, utilized in machine learning
Figure 2C:
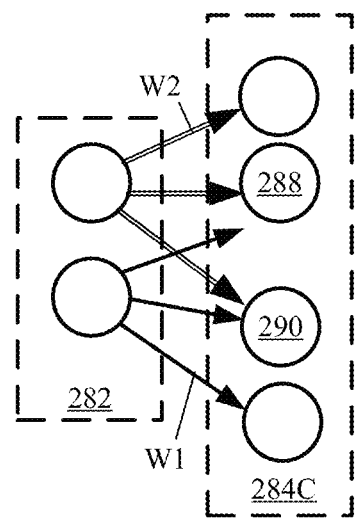
FIG. 2C is a diagram of a portion of the convolution neural network of FIG. 2B, according to at least one embodiment, illustrating assigned weights at connections or neurons.
Figure 2B:
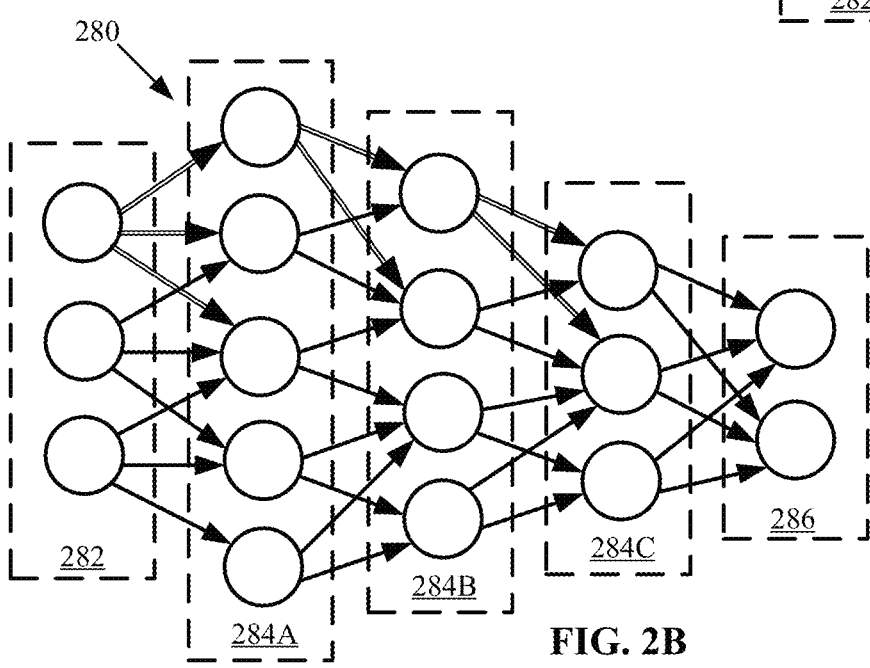
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
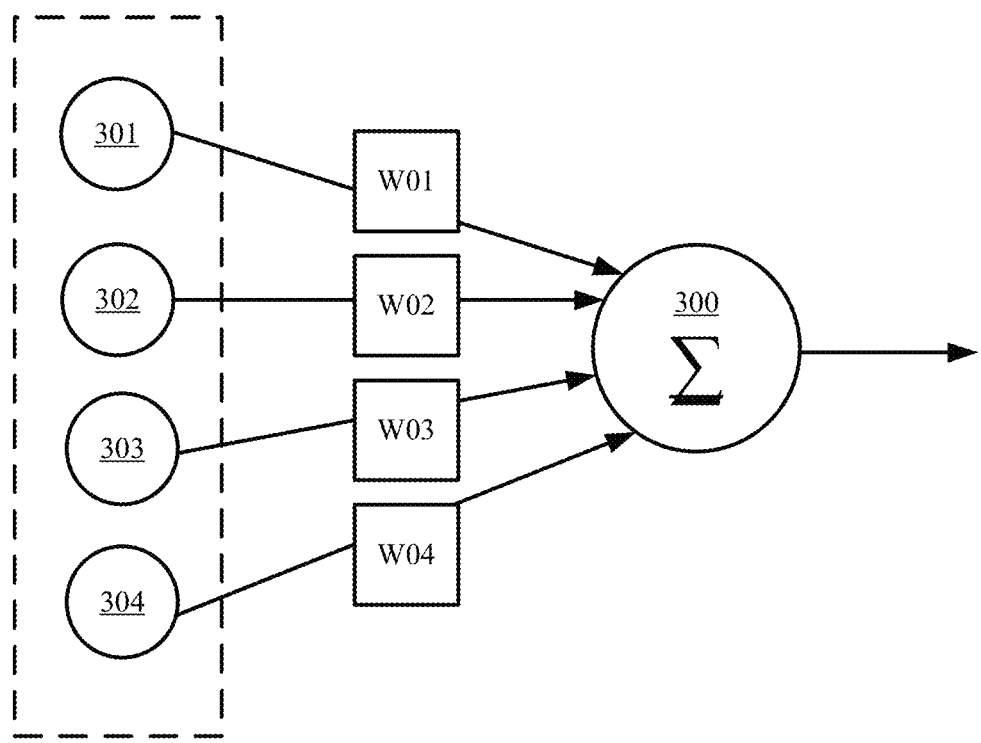
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
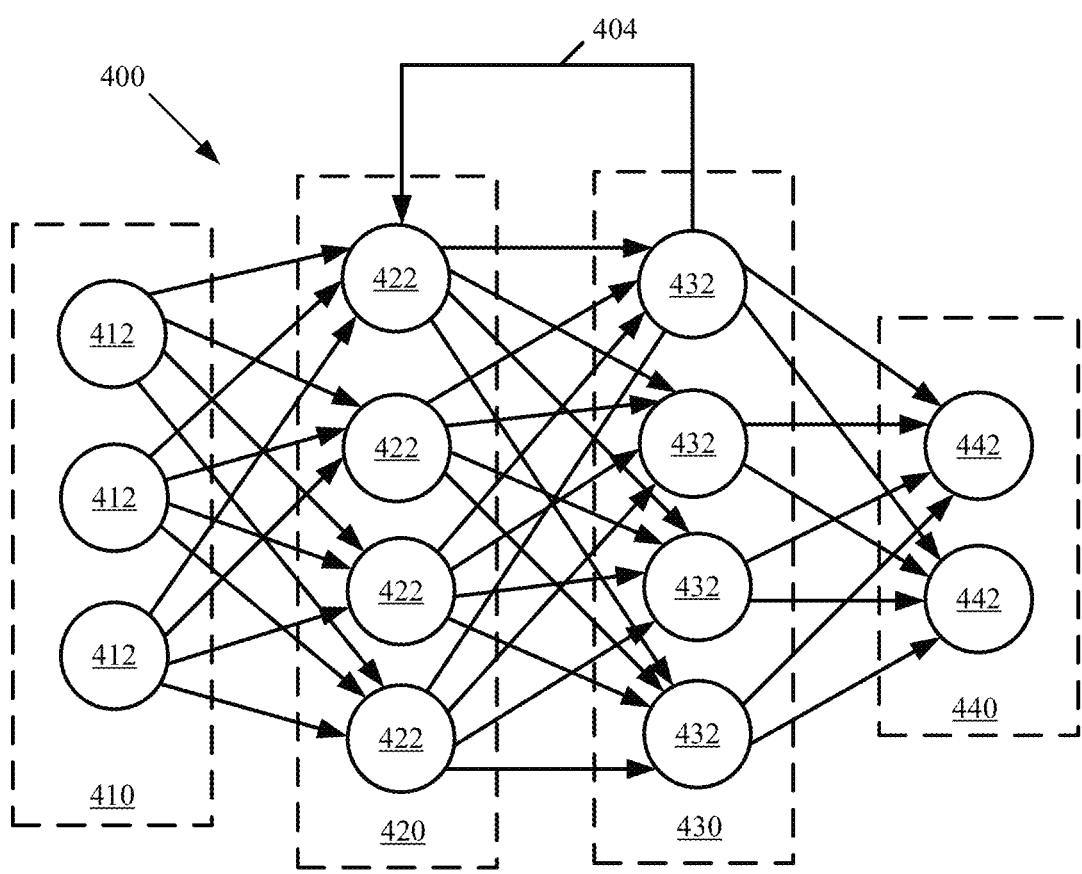
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
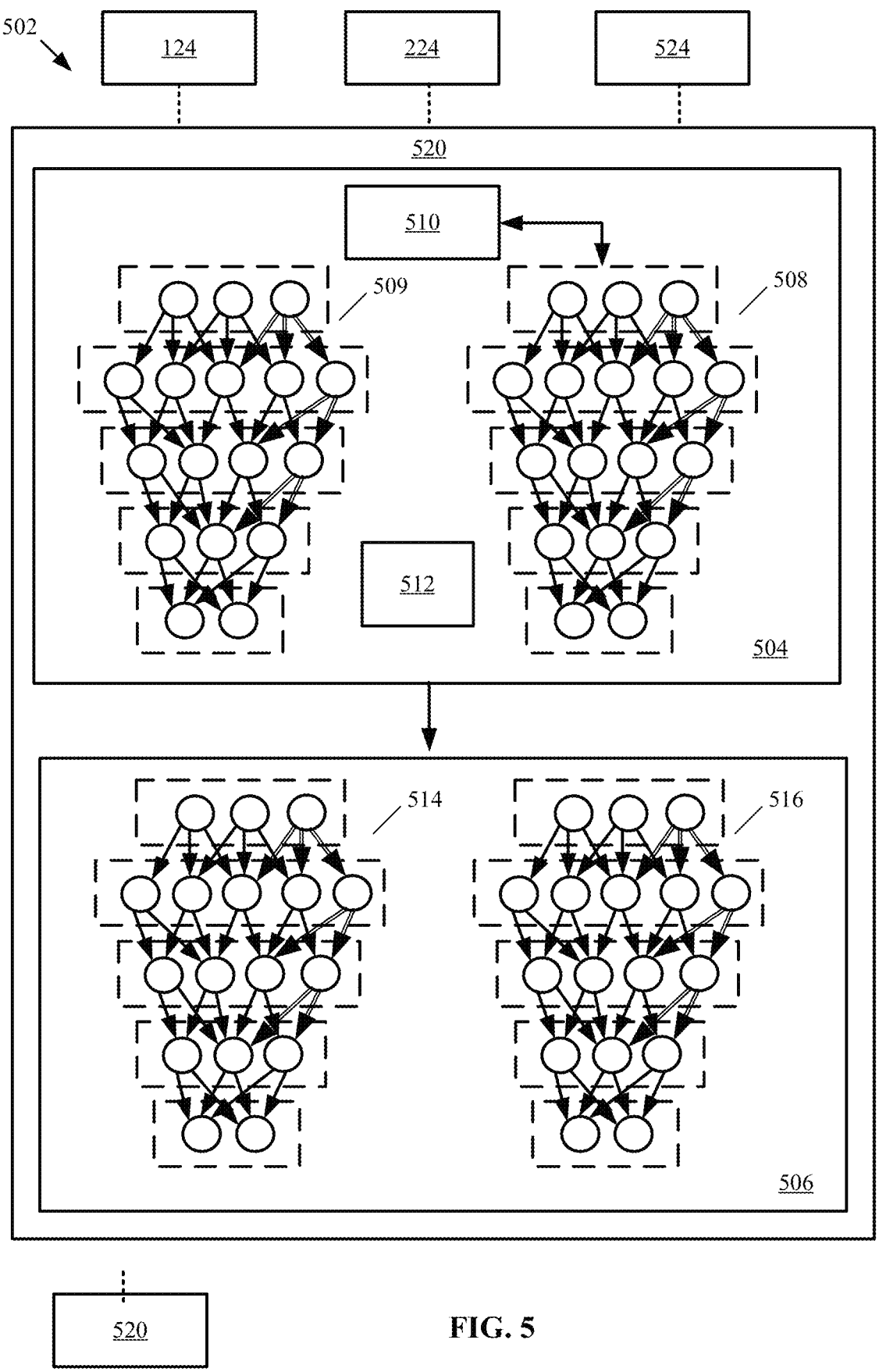
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
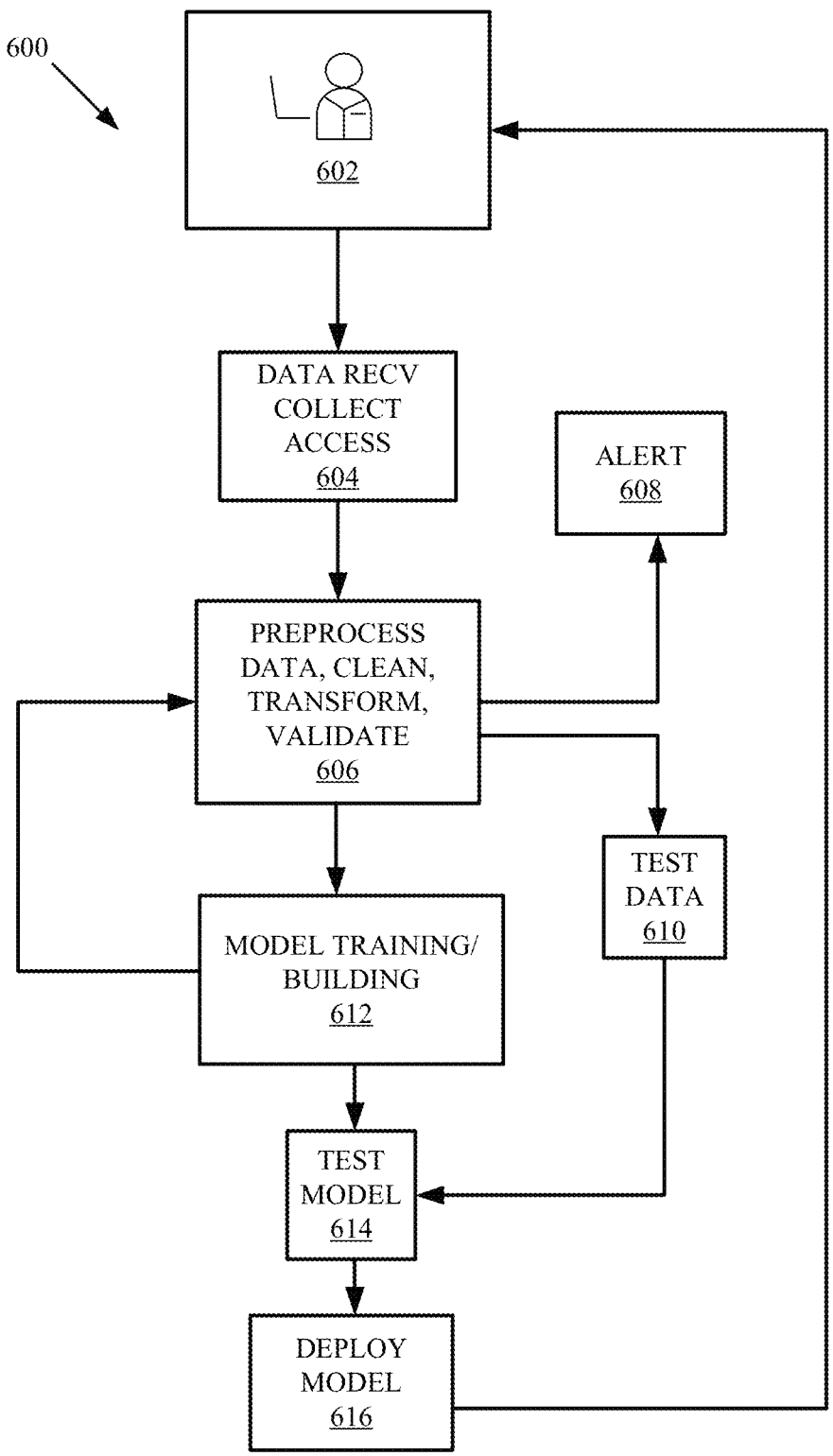
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Figure 7:
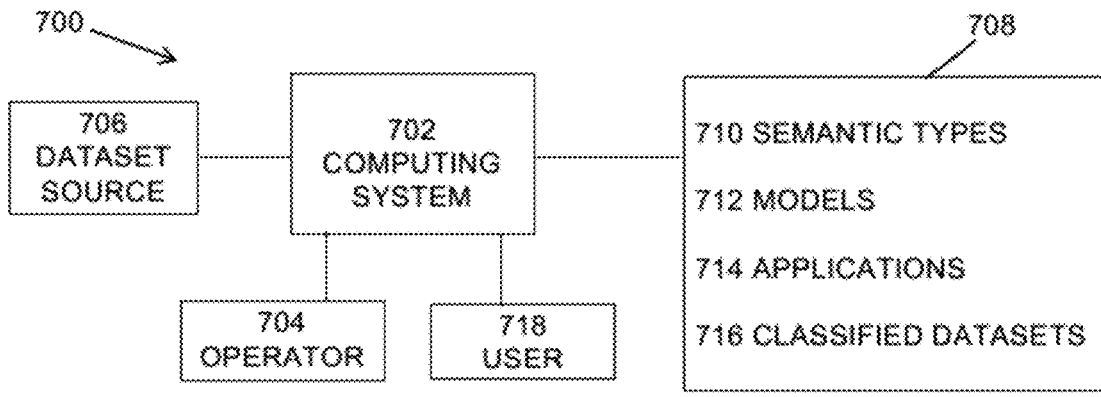
FIG. 7 is a diagram of a system for classifying datasets according to the invention.

FIG. 7 illustrates a classification system 700 for classifying datasets according to at least one embodiment of the invention. The dataset classification system 700 is similar to the enterprise system 200 of FIG. 1 and includes a computing system 702 similar to the computing system 206 of FIG. 1. Therefore, corresponding details of the systems 200 and 206 are not repeated here. At least one operator uses a device 704 (for example, computing device 104 or mobile device 16 shown in FIG. 1) to communicate with the computing system 702 to perform tasks such as inputting datasets, defining and modifying semantic types, defining and modifying classification models, approving classification recommendations, approving confidence labels, etc.

The computing system 702 also communicates with a dataset source(s) 706 to receive datasets to be classified. The source 706 can be an enterprise operating the classification system 700 wherein all of the datasets are generated within the enterprise. Alternatively or in addition, the source 706 could be one or more independent dataset sources that are accessed via the Internet. Thus, the datasets can be received by the computing system 702 from the source(s) 706 automatically or as selected by the operator using the device 704. The datasets typically include a plurality of data fields arranged in a column and row format. The top row typically contains column names.

A memory or storage device 708 is connected with the computing system 702 for exchanging data. The storage device 708 has a first area 710 storing predefined semantic types. The semantic types can be created and modified by the operator using the device 704 and/or by the entity controlling the dataset source 706. A second area 712 in the storage device 708 stores predefined classification models. These models typically include known algorithms for classifying data entries in a dataset. However, based upon experience and machine learning, the known models can be modified and/or new models can be created for more accurate classification results. A third area 714 in the storage device 708 stores computer-readable instructions for an operating system and various software applications. One of stored applications enables the automated classification of datasets according to the invention. A fourth area 716 in the storage device 708 stores datasets to be classified that have been received from the source(s) 706 and datasets previously classified according to the method of the invention.

At least one user can use a device 718 to communicate with the computing system 702 to perform activities related to the datasets. First, the user can download datasets to be classified from the source(s) 706. For example, the user can be authorized to download an updated version of a previously classified dataset rather than notifying the operator via the device 704 to perform this activity. Then classification of the updated dataset can be automatic or require approval by the operator. Second, the user can be authorized to access the classified datasets stored in the fourth area 716 for use in assigned tasks. For example, the task could require sending an email message to all customers with an address in a selected state. The user would search the fourth area 716 for a classified dataset containing customer email addresses and state codes.

Figure 8:
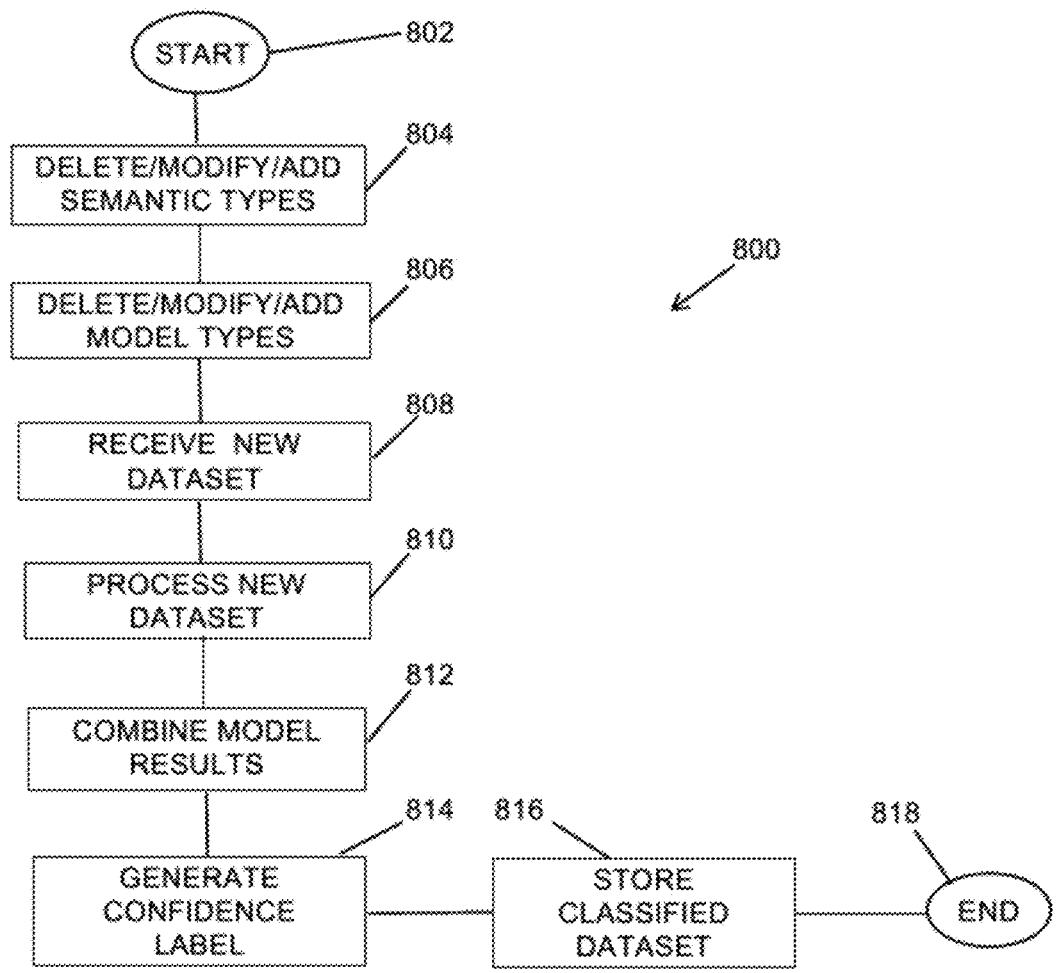
FIG. 8 is a flow diagram of a method for classifying datasets according to the invention.

FIG. 8 is a flow diagram 800 of a classification method according to at least one embodiment of the invention. The method begins at START 802 and, in a step 804, the operator via the device 704 (FIG. 7) can delete and/or modify semantic types stored in the first area 710 of the storage device 708 and can add new semantic types. Next, in a step 806, the operator can delete and/or modify model types stored in the second area 712 of the storage device 708 and can add new model types.

The method then enters a step 808 wherein the computing system 702 receives a new dataset from the source 706. As explained above, the new dataset can be completely new or an updated version of a previously classified dataset. Next, in a step 810, the computing system 702 begins processing the new dataset using the semantic types stored in the first area 710 and two or more of the models stored in the second area 712 to identify the data entries included in the new dataset. The method examines every column in the dataset to identify the data in the data fields by one of the semantic types. The models being used look at what the column is named and the format of the data in the data fields of the column. The operator has the ability to accept, reject or modify the identified semantic types. Once accepted, the semantic types are added to the metadata associated with the dataset.

Figure 9A:
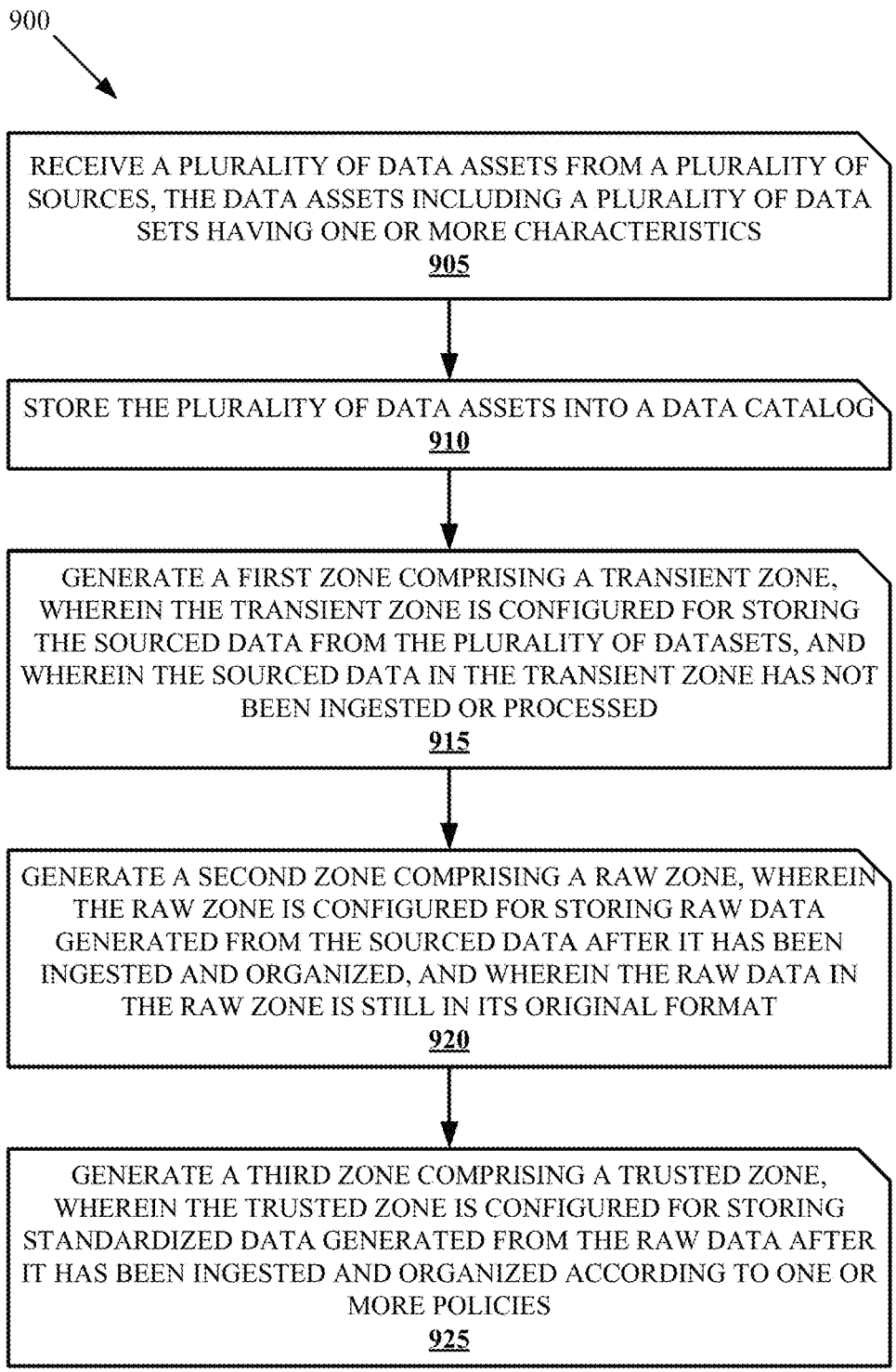
FIGS. 9A-9B depict a block diagram of a method for creating and generating dataset zones, in accordance with an embodiment of the present invention.
Figure 9B:
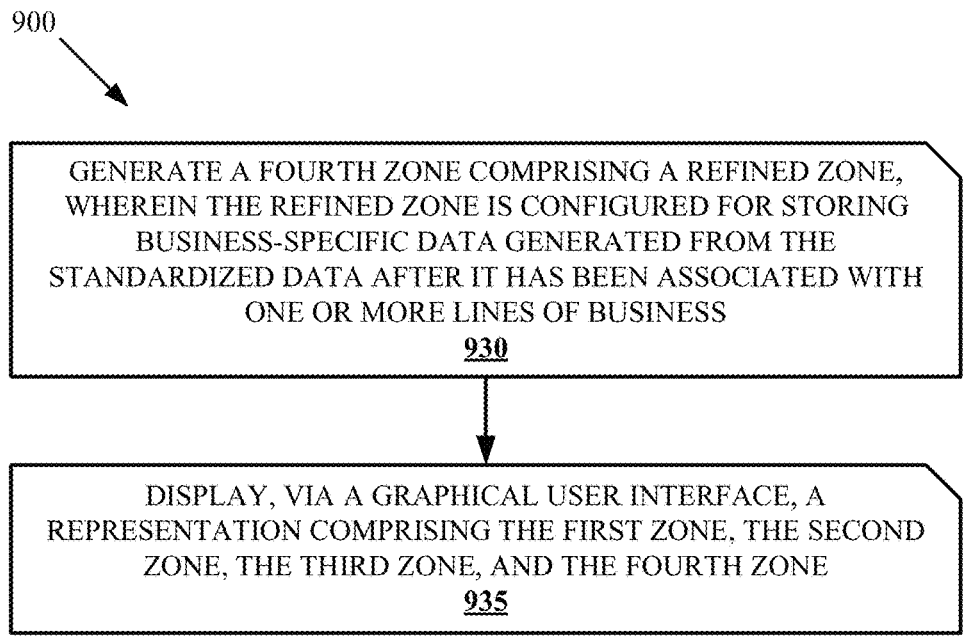

FIGS. 9A-9B depict a flow chart representing a system and method 900, according to at least one embodiment, for generating dataset zones. A zone is a container or tag that can be assigned to artifacts such as datasets. Once an artifact is defined to be in a zone, operations such as searching, viewing, or executing analytics using artifacts can be done based on zone permissions in that zone as the artifact moves through the data processing pipeline. An example zone-based architecture includes a raw zone, a trusted zone, a refined zone, and optionally an analytics aka sandbox zone.

Storage of the data in a hyperscale platform like a relational database management system (RDBMS), data lake, cloud storage like AWS Elastic Storage (S3), Azure Data Lake Storage or others can be based on zones. The opportunity to have permissions and role-based access control for zones can be defined for the zone and cascaded to the underlying storage platform. Additionally, data governance and other policies can be enforced so that data cannot move from one zone to another without executing certain rules. For example, data can be moved from the raw zone to the trusted zone only after it goes through data quality workflows.

The zones can also be established as default zones, with the opportunity to add, delete, or modify the zones. For example, default zones may include RAW, TRUSTED, REFINED, and TRANSIENT.

When utilizing the zones and the data stored therein, a governance graph or data lineage can be created and maintained to indicate to a user where the data is stored and to show data transitions from one zone to another to maintain data quality and to be able to trace the data source and movements through the data processing pipeline (i.e., through the zones). Just as new zones can be created, default zones may also have their rules changed, by a data steward, for example, based on proper privileges. New zones, such as a discovery zone or sandbox zone can be added to help analyze the data without interfering with the integrity of the data. For example, a discovery zone could be used for ingesting one-time data using a self-service ingestion wizard. This provides quick insights and allows a data steward to explore and set governance policies on the incoming dataset. Similarly, a "sandbox" or provisioned zone can be added that may be associated with provisioned data. In general, the zones are defined per tenant and/or line of business.

The zones for data governance are important and innovative in that they provide a consistent and repeatable way to manage data across various platforms. The zones also assure that the data and artifacts have gone through certain sets of rules before they can be available to an end user. Additionally, the zones add another dimension to the overall data observability for the end user to identify data fit for use easily, quickly, and effectively. The zones also assist with data governance in that access to data and artifacts in each zone can be made dependent upon role-based access control. For example, an end user with a particular security clearance or from a different line of business, may not be able to access the same data from the same zone as another end user.

The zones also permit easily digestible views of the datasets by creating different types of assets or artifacts in zones. Some zones may even include artifacts like reports or glossaries that are managed consistently like datasets. In some embodiments, the data pipelines will be able to create artifacts across multiple zones. Thus, data pipeline processing dataset from connected sources would be able to generate and transform derived dataset in multiple zones. Another improvement over the prior art includes the ability to define zones based on data characteristics and rules, along with the ability to connect and catalog datasets from different source applications. Additional, a dataset can be classified and tagged or recommend different governed zones. In various embodiments, the recommendation is based on the asset/artifact on which zone it should belong to.

In various embodiments, datasets tagged to each zone are scored for business metadata accuracy, completeness, and relevance based on the properties and attributes for a particular zone. The ability to define metadata attributes relevant for each zone and to configure scoring parameters for calculating overall score for the particular zone is another advantage. This would allow an end user to determine the overall quality of business metadata being maintained at each zone for consumption.

Thus, the invention generally covers the concept of creating different zones as well as assigning different users to different zones based on their particular role within an organization and various security parameters. While the zones may be created as default zones, they may also be created manually, or through AI or machine learning. Additionally, the zones may have default data quality rules and other policies, or these may be manually created or created through AI. Finally, the data placement into a particular zone may be based on patterns, user workflows, or defaults set within the system. Each of these factors allows for the organization to drive a higher level of analytics on the data supply chain or data flow through the zones while maintaining governance and lineage. Thus, rather than being granular, data usage policies for dataset can be done on a larger scale through the use of zones while still maintaining the necessary guardrails for data governance.

As discussed, FIGS. 9A-9B depict a flow chart representing a system and method 900, according to at least one embodiment, for generating dataset zones. At block 905, the processor receives a plurality of data sets from a plurality of sources using a computer, the data sets including a plurality of traits. Example dataset traits include metadata fields, data usage, data sources including various databases, applications that utilize the data, and patterns of usage of the data. In example embodiments, the data sets may be new data sets or updated versions of previously received datasets. Columns for each of the plurality of data sets are analyzed to identify data in the data fields and to determine column names, fields, records, rows, and the format of the data in the data fields. The metadata contains data about the entire data asset, and the data set may be summarized into a profile that includes the particular characteristics or traits of the data sets.

At block 910, the plurality of data sets and/or data assets are stored into a data catalog. The data catalog is then available for use by any user associated with an entity and having proper authority to access the data catalog. Thus, the system connects to various data sources, examines the data and the sources, ascertains certain features such as data tables, and examines the metadata to create an entry into the data catalog. When browsing the data catalog to find datasets that may be useful for the particular user's business purpose, the user may sort the catalog by various characteristics, allowing for more efficient business processes. In addition, a data steward is responsible for the overall stewardship and/or governance of the use of the assets, including confirming that the assets are being used appropriately and that they are fit for the purpose they are being used for.

At block 915, a first zone or transient zone is generated, wherein the transient zone is configure for storing the sourced data from the plurality of dataset, and wherein the sourced data in the transient zone has not been ingested or processed. In essence, the transient zone or landing zone is for data sourced from the customer (e.g., entity, organization, business, etc.) or from external vendors and data can be temporarily stored in this zone before ingestion and processing.

At block 920, a second zone or raw zone is generated, wherein the raw zone is configured for storing raw data generated from the sourced data after it has been ingested and organized, and wherein the raw data in the raw zone is still in its original format. For example, the data may be a compressed .gz files, XML, etc. Thus, a data steward may indicate that particular datasets belong in the raw zone because they are coming from the source system and quality rules have not been applied yet. In particular embodiments, each line of business has it's own raw zone, each having its own parameters. For the workflow to move from the raw zone to the trusted zone, a particular user may not have access or permission to access the raw zone, in which case the system or platform may send an indication to a user that does have access/permission in order to properly manage or manipulate the data in the raw zone.

At block 925, a third zone or trusted zone is generated, wherein the trusted zone is configured for storing standardized data generated from the raw data after it has been ingested and organized according to one or more policies for the data to be moved through the data processing pipeline to the trusted zone. In example embodiments, the trusted zone contains data that is standardized according to corporate governance policies and data quality policies. Data cleansing and validation occurs in the trusted zone. For example, a data steward or data scientist may sanitize or determine whether the data has been sanitized to ensure that there is not anything in the data that may mislead analytics. Certain data quality rules must be applied to data in the raw zone including data quality checks, masking, tokenization, and various other things that may need to occur in order to ensure personally identifiable information and/or protected personal information is not kept with the data. Thus, once data quality rules have been applied, an authorized user such as a data steward may move the data from the raw zone into the trusted zone. Once certain rules are established for the data or particular patterns regarding the data are determined, the workflow process of moving the data from the raw zone to the trusted zone may be automated.

At block 930, a fourth zone or refined zone is generated, wherein the refined zone is configured for storing business-specific data generated from the standardized data after it has been associated with one or more lines of business. In general, the refined zone contains data required by consuming applications such as reporting/analytics for line-of-business specific views transformed from existing certified data. Thus, the refined zone may also be known as the analytics zone. In example embodiments, each line of business has a different refined zone with differing policies, similar to the other zones. For example, one line of business may have a refined zone for a financial application and a different line of business may have a refined zone for an analytics application, each refined zone having different rules governing the zones. In some embodiments, some users may have access to multiple refined zones. In other embodiments, some users may only have access to a single refined zone. Similarly, some users may have read and write access to a refined zone, while other users only have read access.

In some embodiments, a fifth zone or analytical workspace zone is generated, wherein the analytical workspace zone is configured for storing data that can be validated without altering the data in any other zone, and wherein the analytical workspace zone includes an experimental zone for ad-hoc use cases. In example embodiments, the analytical workspace zone is configured for storing a dataset such that it can be validated without altering the dataset in any of the one or more predefined zones.

Figure 12:
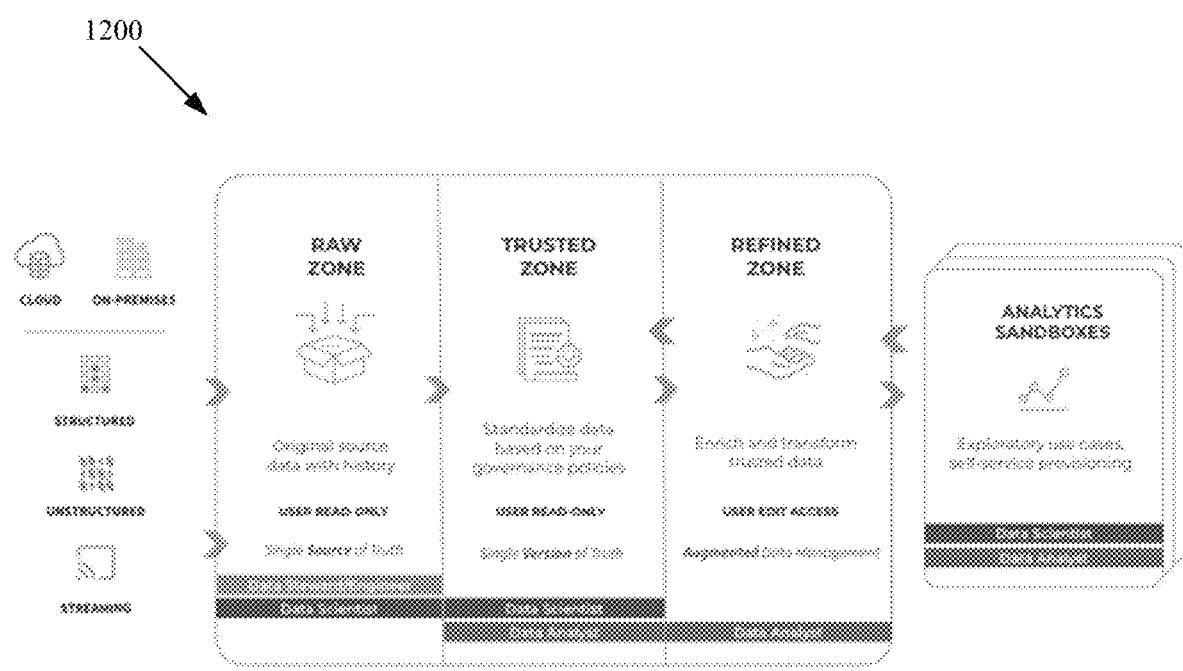
FIG. 12 depicts an example zone-based database structure, in accordance with an embodiment of the present invention.

At block 935, a representation is displayed via a graphical user interface depicting the first zone, the second zone, the third zone, and the fourth zone. An example representation is depicted in FIG. 12, although any suitable representation may be used. In example embodiments, the representation displayed via the graphical user interface may be a governance graph. Essentially, the governance graph creates a holistic view of the impact of changes made and how they may affect the system as a whole, including consequences of the various action taken, and other data sets that may seem unrelated but that would also be affected by any change made to a particular data set. This is imperatively important when it comes to new users accessing the system who may be unfamiliar with the system and make changes that they believe to be correct but that ultimately affect others. However, because the system traces every change made, it is easy to trace the changes back and return the data to is correct form. In other embodiments, the representation displayed may include artifacts, wherein the artifacts are at least one of a report, governance graph, lineage graph, and/or glossary.

Figure 10:
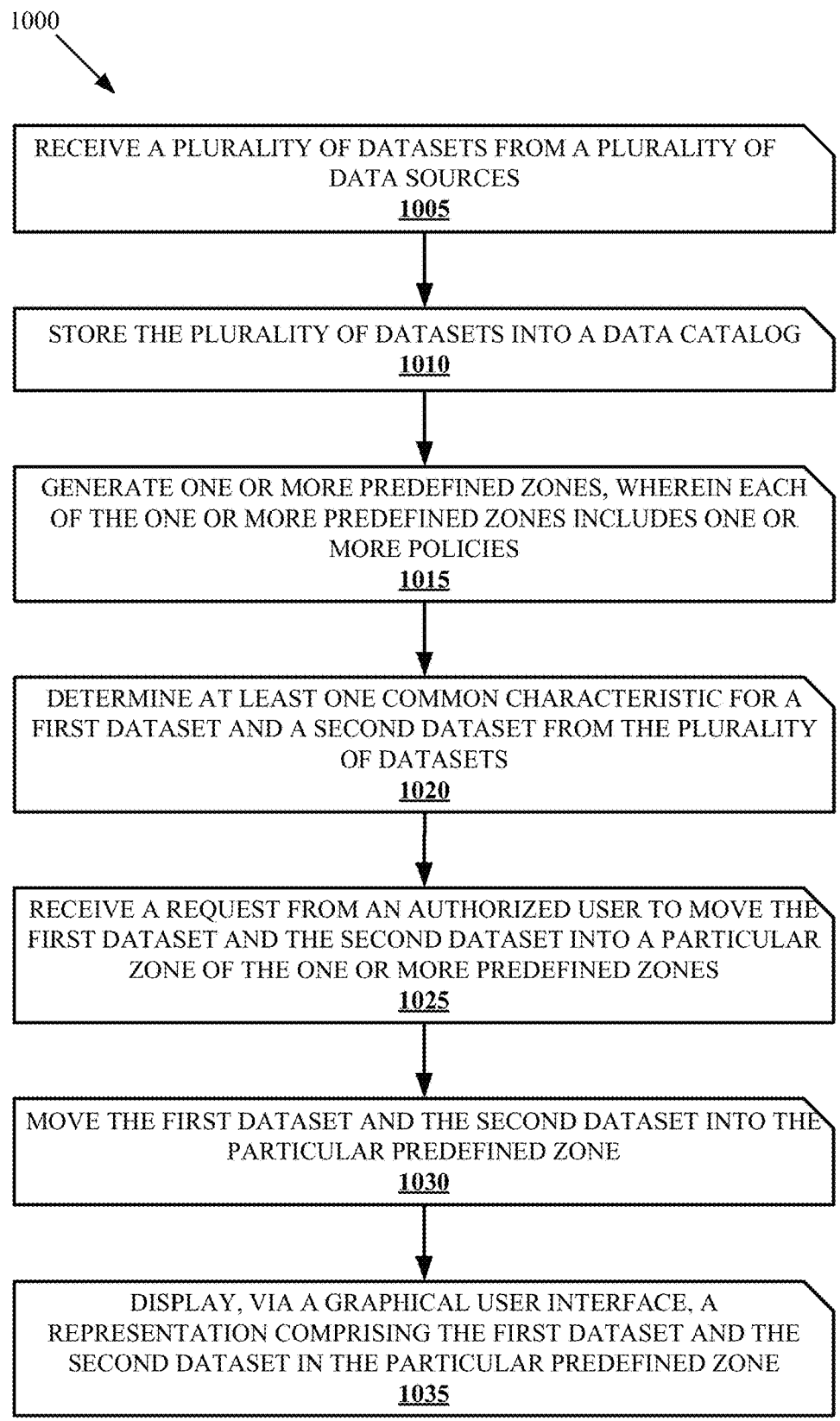
FIG. 10 depicts a block diagram of a method for moving dataset between zones, in accordance with an embodiment of the present invention.

FIG. 10 depicts a flow chart representing a system and method 1000, according to at least one embodiment, for moving datasets between zones. For purposes of clarity and ease of understanding, only the differences between this embodiment and the embodiment described with reference to FIGS. 9A-9B will be discussed.

At block 1005, the system receives a plurality of datasets from a plurality of data sources and, at block 1010, the plurality of datasets are stored into a data catalog.

At block 1015, one or more predefined zones are generated, wherein each of the one or more predefined zones includes one or more policies, similar to the zones discussed above (e.g., first/transient, second/raw, third/trusted, fourth/refined).

At block 1020, at least one common characteristic is determined for a first dataset and a second dataset from the plurality of datasets. In example embodiments, the common characteristic or trait may be any of a common field, common usage, common source, common database, common generating application and/or a common pattern of usage. In some embodiments, the process is repeated such that the system determines at least one common trait for the first data set and a second, third, fourth, etc. data set from the plurality of data sets. The more comparisons and common characteristics that the system discovers, the more robust and useful the governance graph will be. In various embodiments, the common characteristic indicates a connection between first dataset and the second dataset.

At block 1025, a request is received from an authorized user to move the first dataset and the second dataset into a particular zone of the one or more predefined zones. As discussed, an authorized user may be a data steward or data scientist. In example embodiments, the datasets are moved according to the rules and policies of the zones. For example, data sourced from an external vendor would be moved to the transient zone, data that has been ingested and organized but remains in its original form would be moved to the raw zone, data that is standardized according to corporate governance and quality policies would be moved to the trusted zone, and data that is required by a consuming application would be moved to a refined zone. While the movement of these various datasets may be manual, they may, in some embodiments, be automated. In some embodiments, when moving the data, an authorized user may override the one or more policies of the particular zones. These policies, as described above, include role-based access control policies, corporate governance policies, data quality control policies, and data movement policies. Thus, whether manual or automatic, at block 1030, the first dataset and the second dataset are moved into the particular predefined zone that they belong in.

At block 1035, a representation is displayed, via a graphical user interface, of the first dataset and the second dataset in the particular predefined zone. The representation may be any suitable representation as described with reference to block 935 of FIG. 9B.

Figure 11A:
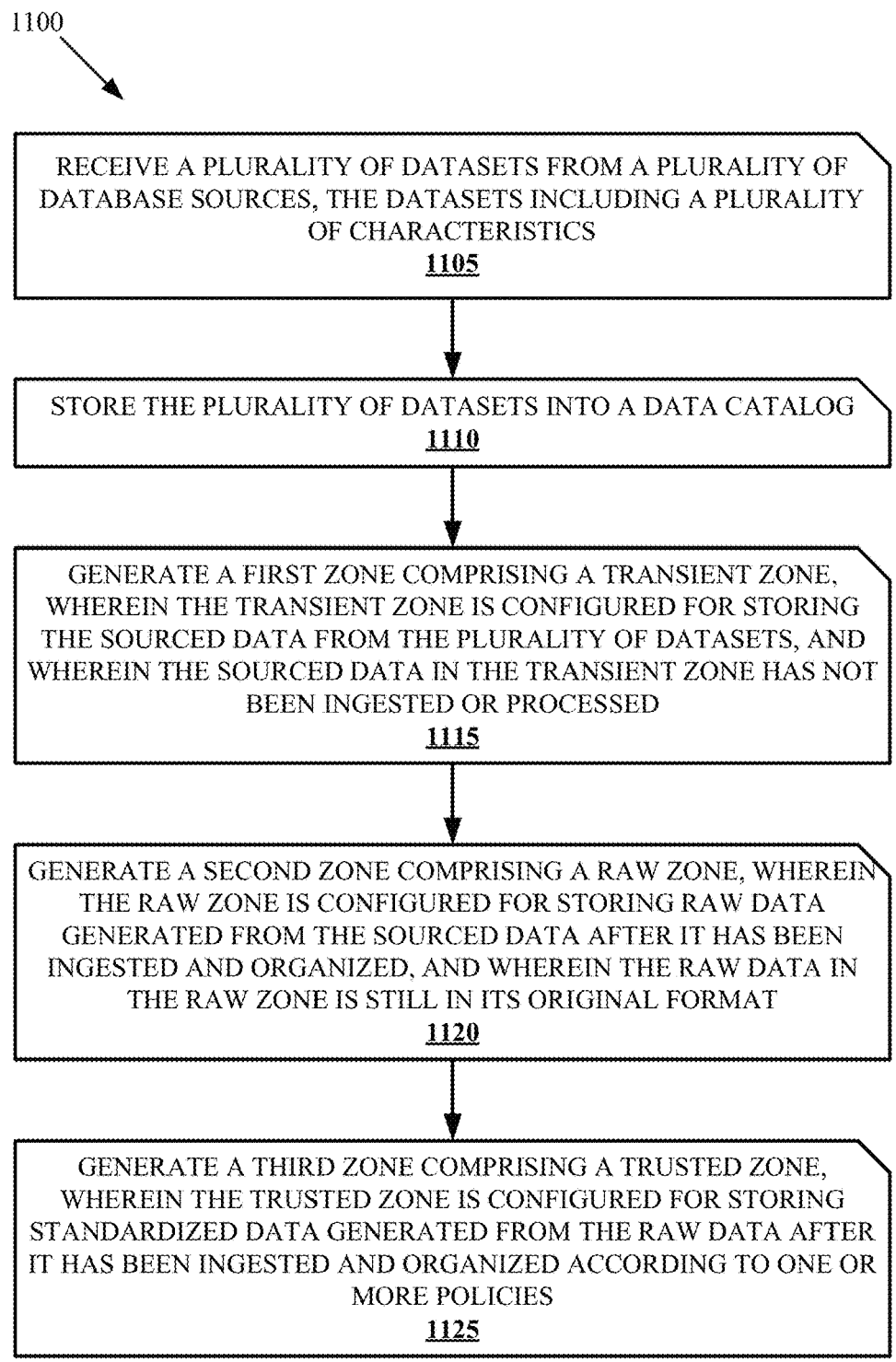
FIGS. 11A-11C depict a block diagram of a method for zone-based database management, in accordance with an embodiment of the present invention.
Figure 11B:
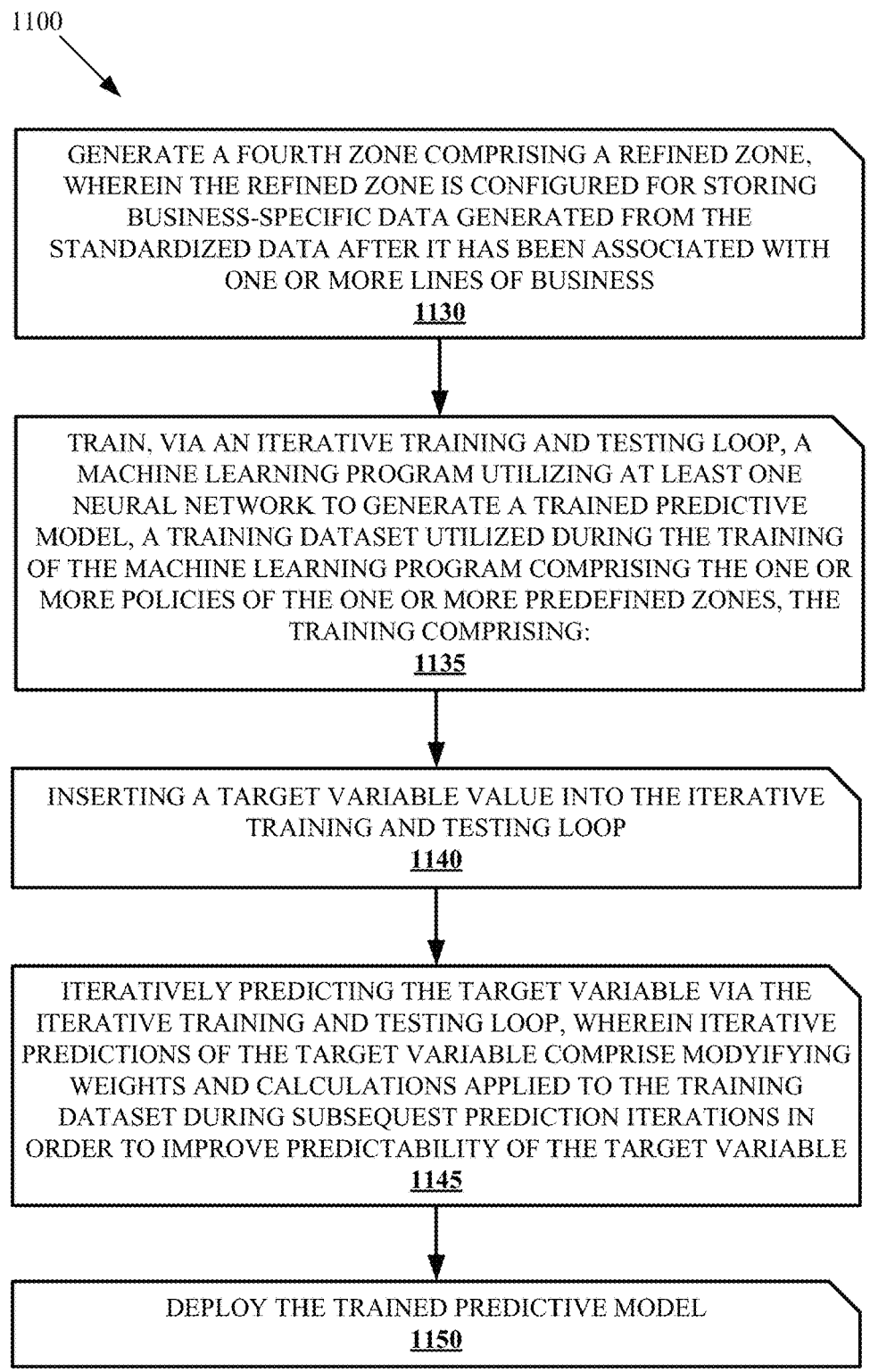
Figure 11C:
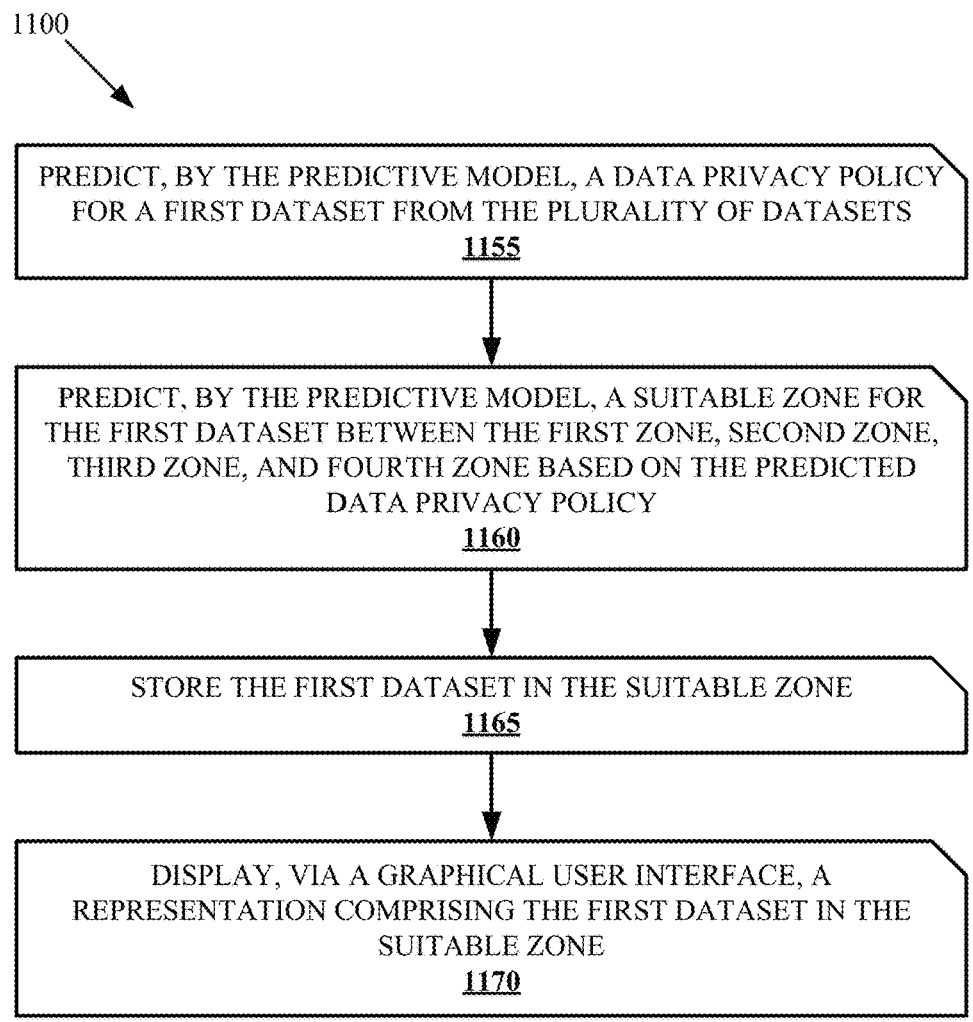

FIGS. 11A-11C depict a flow chart representing a system and method 1100, according to at least one embodiment, for zone-based database management. For purposes of clarity and ease of understanding, only the differences between this embodiment and the embodiments described with reference to FIGS. 9A-9B and FIG. 10 will be discussed.

At block 1105, a plurality of datasets is received from a plurality of database sources, the plurality of datasets including a plurality of characteristics. In example embodiments, the plurality of characteristics may include anything discussed above or anything that may be found in the metadata of the datasets. At block 1110, the system stores the plurality of datasets into a data catalog.

At block 1115, a first zone or transient zone is generated, wherein the transient zone is configure for storing the sourced data from the plurality of dataset, and wherein the sourced data in the transient zone has not been ingested or processed.

At block 1120, a second zone or raw zone is generated, wherein the raw zone is configured for storing raw data generated from the sourced data after it has been ingested and organized, and wherein the raw data in the raw zone is still in its original format.

At block 1125, a third zone or trusted zone is generated, wherein the trusted zone is configured for storing standardized data generated from the raw data after it has been ingested and organized according to one or more policies for the data to be moved through the data processing pipeline to the trusted zone.

At block 1130, a fourth zone or refined zone is generated, wherein the refined zone is configured for storing business-specific data generated from the standardized data after it has been associated with one or more lines of business.

At block 1135, a machine learning program is trained via an iterative training and testing loop utilizing at least one neural network to generate a trained predictive model, a training dataset utilized during the training of the machine learning program including the one or more policies of the one or more predefined zones.

At blocks 1140-1145, the training includes: (a) inserting a target variable value into the iterative training and testing loop; and (b) iteratively predicting the target variable via the iterative training and testing loop, wherein iterative predictions of the target variable comprise modifying weights and calculations applied to the training dataset during subsequent prediction iterations in order to improve predictability of the target variable.

Particular embodiments of the invention utilize machine learning and predictive analysis. For example, the system may be used to predict how the data may be used in the future, whether it would even be useful in the future in instances where the data had not been accessed for a predetermined period of time, whether a particular data set is likely to be non-compliant based on the amount of users access the data, or to predict new governance policies or rules that will be necessary based on new regulations received from various sources. To that effect, the system, using a machine learning model, could provide guidance on how the rules could be established such that the data steward or the owner of the data does not have to go in and manually enter such governance policies. Governance policies for a particular entity, for example from a bank, could also be predicted based on other policies already instituted with respect to other zones. For example, where social security numbers are always removed before a dataset can enter the trusted zone, the machine learning program could be taught to apply the same rules to any data collected by the new system.

Machine learning allows a data steward, for example, to set certain data governance parameters, and then allow the system to build in other parameters based on the parameters or framework entered by the data steward, saving time and resources. Machine learning is also particularly useful in this situation where the system may be used with various different types of entities such as financial institutions, that deal with personally identifiable information or protected personal information regularly. By instituting certain governance policies predicted to be beneficial to the particular entity or to a particular zone, data breaches and other data leaks may be lessened or altogether prevented. The machine learning program can be used to predict demand for a particular data set, to detect and halt suspicious or inappropriate usage of data, and to determine the overall value of the datasets accessible to the entity. For example, if a particular dataset is rarely accessed, the machine learning system may suggest that the particular dataset be deleted to free up space or be exchanged for a more beneficial dataset. Most importantly, at the executive level, with machine learning and the governance graph depiction, the organization is able to determine whether the datasets are creating value for the company and for the end user.

At block 1150, the system deploys the trained predictive model.

At block 1155, a data privacy policy is predicted by the predictive model for a first dataset from the plurality of datasets. The predicted data privacy policy may be any suitable data privacy or governance policy.

At block 1160, a suitable zone is predicted by the predictive model for the first dataset. In various embodiments, the suitable zone may be the first/transient zone, the second/raw zone, the third/trusted zone, or the fourth/refined zone. In some embodiments, the suitable zone may actually be an analytical workspace zone, as described above. In other embodiments, the suitable zone may be an uncategorized zone. An uncategorized zone is a bucket rather than a zone and is associated with datasets that are not associated with any other zones. For example, if a zone is deleted and there are datasets in the deleted zone, the datasets are moved into the uncategorized zone. In various embodiments, an authorized user may define dataset characteristics and zone rules for the suitable zone, or these may be predicted by the machine learning program. In particular embodiments, the suitable zone may be a secure zone, wherein the secure zone is configured for storing one or more datasets that contain at least one of personal information, personally identifiable information, sensitive information, and protected personal information. Alternatively, the suitable zone may be an unsecure zone, wherein the unsecure zone is configured for storing basic datasets that contain public or non-confidential/personal information.

At block 1165, the first dataset is stored in the suitable zone (determined by the machine learning program) and at block 1170, a representation is displayed via a graphical user interface that includes the first dataset in the suitable zone.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computer-implemented method for moving datasets between zones, the method comprising:
   receiving, by a processor, a plurality of datasets from a plurality of sources using a computer, the datasets including a plurality of characteristics;
   storing, by the processor, the plurality of datasets into a data catalog in a storage device;
   generating, by the processor, a plurality of predefined zones in the storage device, wherein each of the predefined zones includes one or more policies associated with a processing pipeline, wherein the plurality of predefined zones comprise: (i) a transient zone configured for storing the plurality of datasets, (ii) a raw zone configured for storing raw data generated from the plurality of datasets after the plurality of datasets have been ingested and organized according to the processing pipeline, (iii) a trusted zone configured for storing standardized data generated from the raw data after the raw data has been ingested and organized according to the processing pipeline and the one or more policies, (iv) a refined zone configured for storing business-specific data generated from the standardized data according to the processing pipeline after the standardized data has been organized by one or more lines of business, and (v) an analytical workspace zone configured for storing data for validation without altering the data in any of the other zones, wherein the analytical workspace zone comprises an experimental zone for ad-hoc use cases;

determining, by the processor, at least one common characteristic for a first dataset and a second dataset from the plurality of datasets;

receiving, by the processor, a request from an authorized user to move the first dataset and the second dataset into a particular zone of the plurality of predefined zones;

determining, by the processor for the particular zone, one or more operations of the processing pipeline;

executing, by the processor, the one or more operations of the processing pipeline to move the first dataset and the second dataset into the particular predefined zone; and displaying, by the processor via a graphical user interface, a representation comprising the first dataset and the second dataset in the particular predefined zone.

2. The computer-implemented method of claim 1, wherein the authorized user comprises a data steward.

3. The computer-implemented method of claim 2, wherein the authorized user can override the one or more policies of the predefined zones.

4. The computer-implemented method of claim 1, wherein the one or more policies comprises role-based access control policies, corporate governance policies, and data quality control policies.

5. The computer-implemented method of claim 4, wherein the one or more policies comprise data movement policies, wherein the data movement polices require particular steps to be executed before data can be moved from a first one of the plurality of predefined zones to a second one of the plurality of predefined zones.

6. The computer-implemented method of claim 5, wherein the data movement policies comprise processes preventing data from being moved without following particular rules.

7. The computer-implemented method of claim 1, wherein the representation displayed via the graphical user interface comprises a governance graph.

8. The computer-implemented method of claim 1, wherein the representation displayed via the graphical user interface comprises artifacts, wherein the artifacts are at least one of a report, governance graph, lineage, and glossary.

9. The computer-implemented method of claim 1, wherein the authorized user is permitted to create new zones.

10. The computer-implemented method of claim 1, wherein the datasets in the transient zone have not been ingested or processed, wherein the raw data in the raw zone is still in its original format.

11. The computer-implemented method of claim 1, wherein the one or more operations of the processing pipeline comprise generating, by the processor, the standardized data by cleansing and validating the raw data.

12. The computer-implemented method of claim 11, wherein the cleansing and validating the raw data comprises at least one of data quality checks, masking, tokenization, removing personal information, removing personally identifiable information, removing sensitive information, and removing protected personal information.

13. The method of claim 1, wherein each predefined zone is a respective container in the storage device.

14. The computer-implemented method of claim 13, wherein the particular zone comprises the analytical workspace zone, wherein the request specifies to move the first and second datasets from the transient zone to the analytical workspace zone, wherein performing the one or more operations of the processing pipeline comprises:

processing, by the processor based on the processing pipeline, the data in the transient zone to ingest and organize the data in the transient zone, thereby generating the raw data;

storing, by the processor, the raw data in the raw zone;

processing, by the processor based on the processing pipeline, the raw data in the raw zone to standardize the raw data, thereby generating the standardized data;

storing, by the processor, the standardized data in the trusted zone;

processing, by the processor based on the processing pipeline, the standardized data in the trusted zone to associate the standardized data with one or more lines of business, thereby generating the business-specific data;

storing, by the processor, the business-specific data in the refined zone; and storing, by the processor, the business-specific data in the analytical workspace zone for validation.

15. The computer-implemented method of claim 13, further comprising:

determining, by the processor for each zone, a respective subset of the plurality of datasets;

computing, by the processor for each subset, a respective score based on: (i) metadata accuracy of each subset, (ii) a completeness of the data in each subset, and (iii) a relevance of each subset, wherein the relevance is based on one or more properties and one or more attributes of the zone associated with each subset.

16. The computer-implemented method of claim 15, further comprising:

training, by a neural network, a predictive model based on training data comprising the zones and one or more policies, wherein the training comprises an iterative training and testing loop utilizing the neural network, wherein the iterative training and testing loop comprises:

(i) inserting a target variable value into the iterative training and testing loop; and (ii) iteratively predicting the target variable via the iterative training and testing loop.

17. The computer-implemented method of claim 16, further comprising:

receiving one or more rules;

generating, by the trained predictive model based on the one or more rules: (i) a first new set of policies for the transient zone, (ii) a second new set of policies for the raw zone, (iii) a third new set of policies for the trusted zone, (iv) a fourth new set of policies for the refined zone, and (v) a fifth set of policies for the analytical workspace zone; and applying: (i) the first new set of policies to the transient zone, (ii) the second new set of policies to the raw zone, (iii) the third new set of policies to the trusted zone, (iv) the fourth new set of policies to the refined zone, and (v) the fifth set of policies to the analytical workspace zone.

18. The computer-implemented method of claim 17, further comprising:
  receiving a new dataset;
  generating, by the trained predictive model, a predicted zone for the new dataset, wherein the predicted zone is one of the plurality of predefined zones.

19. A computer system for creating for moving datasets between zones, the computer system comprising:
  at least one processor;
  a communication interface communicatively coupled to the at least one processor; and
  a memory device storing executable code that, when executed, causes the processor to:
  receive a plurality of datasets from a plurality of sources using a computer, the datasets including a plurality of characteristics;
  store the plurality of datasets into a data catalog in a storage device;
  generate a plurality of predefined zones in the storage device, wherein each of predefined zones includes one or more policies associated with a processing pipeline, wherein the plurality of predefined zones comprise: (i) a transient zone configured to store the plurality of datasets, (ii) a raw zone configured to store raw data generated from the plurality of datasets after the plurality of datasets have been ingested and organized according to the processing pipeline, (iii) a trusted zone configured to store standardized data generated from the raw data after the raw data has been ingested and organized according to the one or more policies, (iv) a refined zone configured to store business-specific data generated from the standardized data after the standardized data has been organized by one or more lines of business, and (v) an analytical workspace zone to store storing data for validation without altering the data in any of the other zones, wherein the analytical workspace zone comprises an experimental zone for ad-hoc use cases;
  determine at least one common characteristic for a first dataset and a second dataset from the plurality of datasets;
  receive a request from an authorized user to move the first dataset and the second dataset into a particular zone of the plurality of predefined zones;
  determine, for the particular zone, one or more operations of the processing pipeline;
  execute the one or more operations of the processing pipeline to move the first dataset and the second dataset into the particular zone; and
  display, via a graphical user interface, a representation comprising the first dataset and the second dataset in the particular predefined zone.

* * * * *